United States Patent [19]

Ball

[11] 4,453,910

[45] Jun. 12, 1984

[54] PORTABLE HANDRAIL SPLICING AND REPAIR APPARATUS

[76] Inventor: Ronald H. Ball, 322 Fairall St., Ajax, Ontario, Canada

[21] Appl. No.: 540,058

[22] Filed: Oct. 7, 1983

[51] Int. Cl.³ .............................................. B29C 1/00
[52] U.S. Cl. .................................................... 425/12
[58] Field of Search ....................................... 425/12

[56] References Cited

U.S. PATENT DOCUMENTS 4,347,096  8/1982  Schorscher ...................... 425/12 X Primary Examiner—J. Howard Flint, Jr.
Attorney, Agent, or Firm—Zarley, McKee, Thomte, Voorhees & Sease

[57] ABSTRACT

The present invention discloses portable apparatus for heating and molding flexible elastomeric handrails having internal core conforming to the internal surface of the handrail and a flexible sheet which can be fitted over the handrail and conforming to the external surface. The device has electrical heating elements which raise the temperature to the necessary vulcanizing or molding temperature.

7 Claims, 5 Drawing Figures

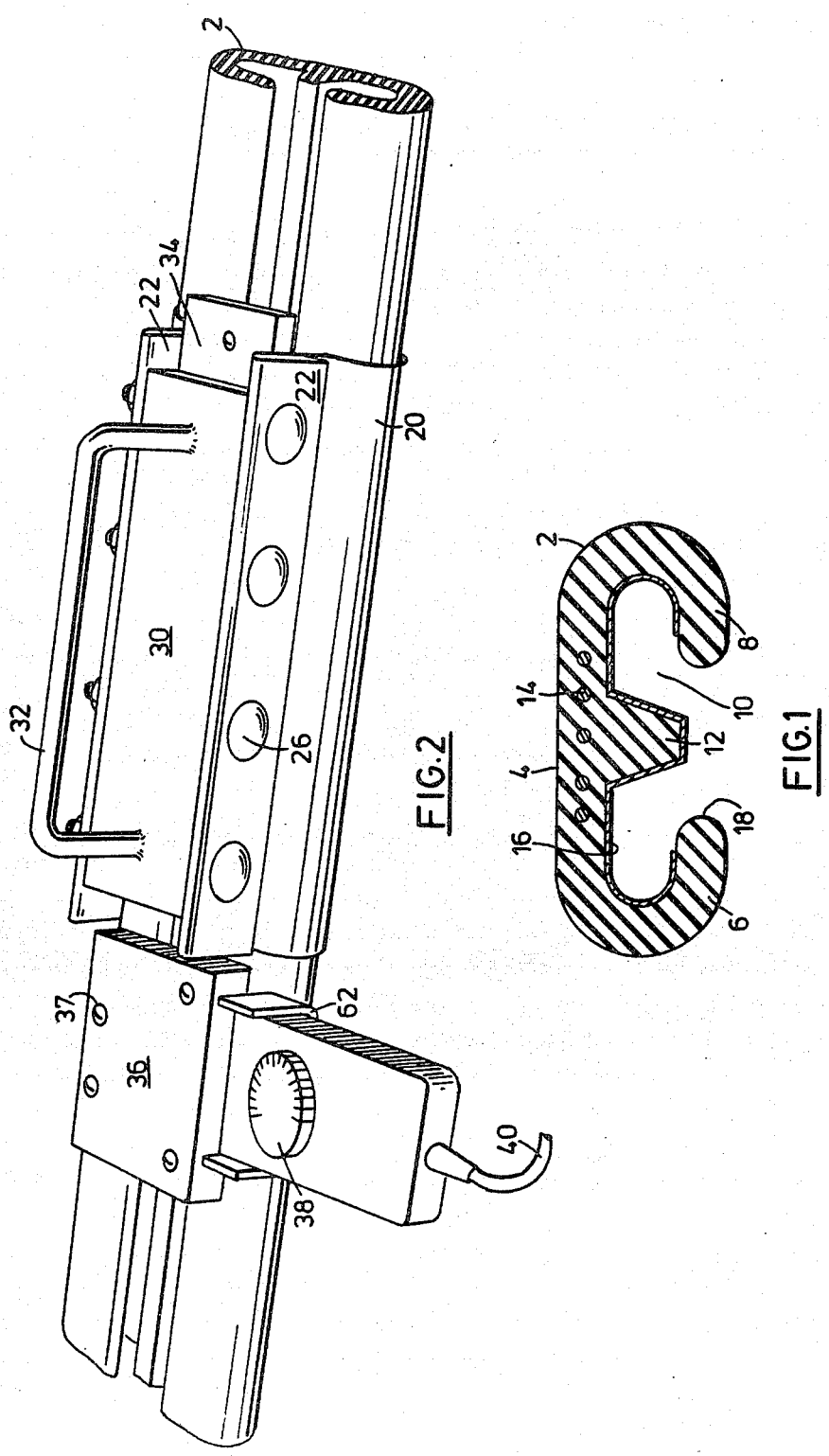

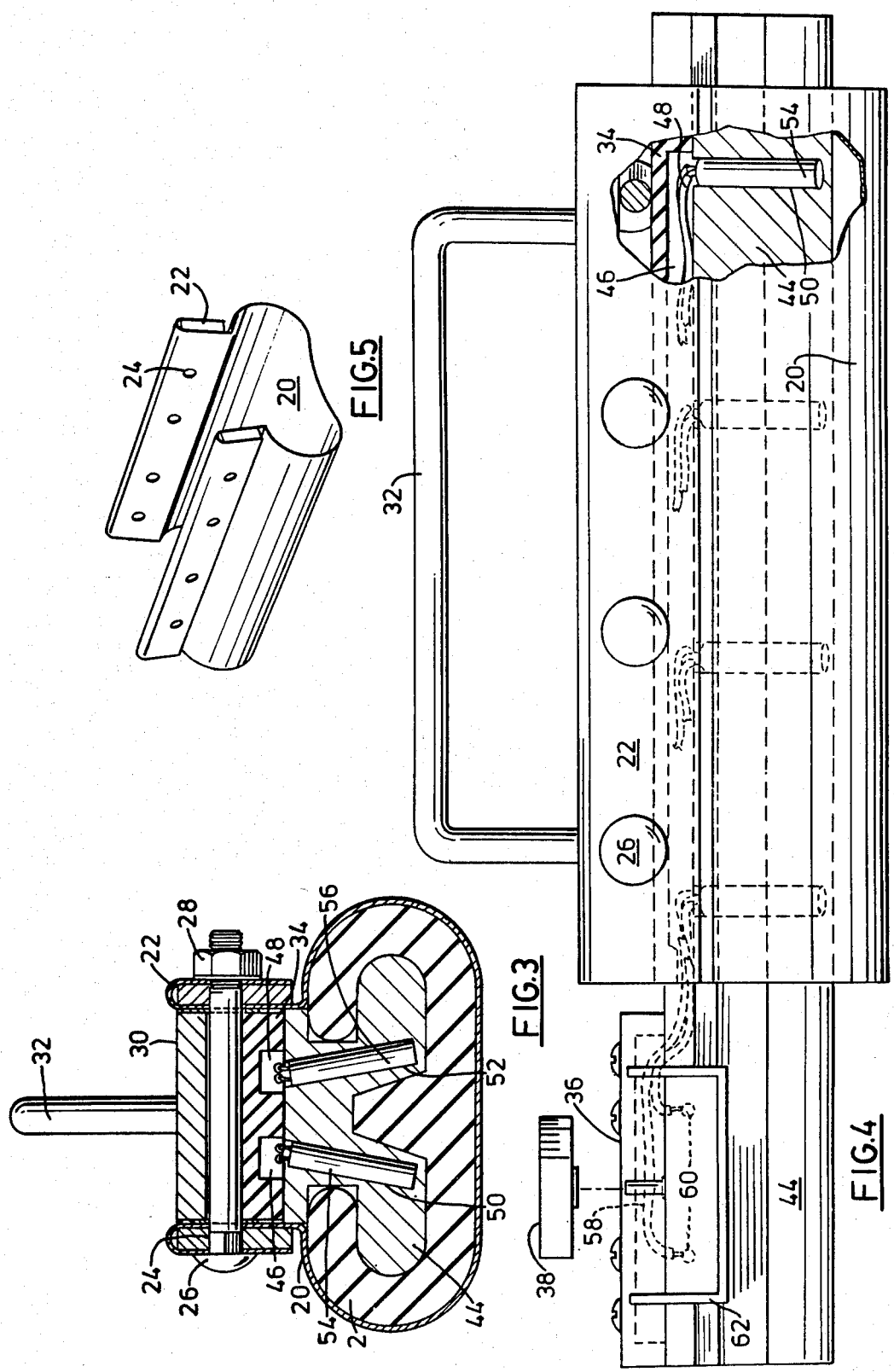

PORTABLE HANDRAIL SPLICING AND REPAIR APPARATUS

This invention relates to handrails, particularly of the type used in escalators and moving sidewalks. More particularly, it relates to a means for connecting abutting ends or repairing damaged portions of such handrails.

With the increasing use of escalators and movable sidewalks, the use of handrails which are also movable and flexible enough to be drawn over pulleys and drive wheels, becomes correspondingly more prominent.

By far the most common type of escalator handrail is one which is made principally of rubber with various other elements included such as steel wires or cables and flat metal strips for longitudinal strength and resistance to stretching, as well as one or more layers of canvas or similar fabric.

Handrails of this nature are often fabricated by laying up various layers of rubber in sequence with the other structural elements and subsequently vulvanizing the rubber layers about the other elements to form a substantially homogenous rubber handrail with inclusions embedded therein.

However, the finished handrail is a continuous loop and therefore the two ends of a strip of the rubber material must be spliced together and the rubber fused or vulcanized.

While this is often done in the factory during the original manufacutre, occasionally this must be done during installation or during renovation or repairs to the equipment at the place of installation (often referred to as "in the field").

Furthermore rubber handrails sometimes become damaged and the rubber body needs to be repaired by fusing or vulcanizing additional rubber at the place of damage without removing the handrail from the installed equipment.

Therefore, while vulcanizing equipment has long been used in the original manufacture of handrails, this equipment is for the most part large and permanently installed heavy equipment, and often automated and power driven.

Some modified versions of the vulcanizing equipment have been fabricated for use in the field but even these involve heavy pieces of metal which, when assembled together, provide the molded shape in which rubber shapes may be vulcanized.

It is the purpose of the present invention to provide a light weight easily portable apparatus cable of surrounding and shaping a typical handrail and heating same to vulcanize the rubber for connecting the ends or repairing damaged portions of the handrail.

It is also the purpose of this invention to provide a piece of equipment which may be used for vulcanizing articles such as handrails in the field by a single operator, without the necessity of a lot of man power or the removal of the handrail to the factory or shop for splicing or repairs.

These objects and other advantages may be achieved by the present invention which provides a portable apparatus for heating and molding flexible or elastomeric materials and flexible handrails with a defined internal surface configuration and a curved external surface, which apparatus comprises an elongated core with a cross-section conforming to the cross-sectional shape of the interior surface of the handrail, means for heating the core, and an elongated outer cover formed of a flexible sheet, preferably of thin flexible stainless steel, which may be attached and detached to and from said core and adapted in its attached configuration to conform to the curved external shape of the surface of the handrail. The apparatus includes means to fasten the cover to the core and heating means which includes a series of electrical cartridge heaters inserted in bore holes at spaced intervals in the core and connected by electrical wiring means to a power source and controlled by a thermostat. The outer cover is flexible to allow it to be inserted over a handrail or removed and is fixed in position by bolts extending through flanges running longitudinally along the lateral edges of the sheet. Preferably the apparatus also has a spacer between the flanges through which the fastening bolts extend and an insulating block thermally and electrically insulating the heated core from the spacer and the outer cover. Thus a small, light and portable apparatus is provided.

The nature of the invention and its advantages may be better understood by the following description of one embodiment thereof with reference to the drawings in which:

FIG. 1 illustrates a cross-section of a typical escalator handrail;

FIG. 2 illustrates a perspective view of the apparatus incorporating the present invention;

FIG. 3 is a cross-section of the apparatus in FIG. 2;

FIG. 4 is a cut-away side elevation view of the assembled apparatus in FIGS. 2 and 3; and FIG. 5 is a perspective view of a part of the apparatus in FIG. 2.

FIG. 1 illustrates the cross-section of a typical escalator handrail 2 in which the external surface 4 is gently curved to fit the hand of a pedestrian and curves downwardly and inwardly at 6 and 8 to surround and enclose the guides which are part of the escalator structure and fit into the interior 10. The illustrated handrail has a central spine 12 which extends downwardly from the inside surface of the top and which serves to further guide and stiffen the handrail, although this feature is sometimes omitted.

Many handrails additionally have wires or steel cables running longitudinally, as illustrated at 14, which are embedded in the rubber body of the handrail to add tensile strength.

The interior surface 16 of the handrail in FIG. 1 has a canvas fabric liner which lends some strength to the structure and eliminates some of the friction which would exist between the guides and the handrail if bare rubber was exposed.

Handrails such as illustrated in FIG. 1 are commonly made by laying down long strips of rubber with such additional layers as the steel wires 14 and the interior layer of canvas 16. The outer layer is then wrapped around the lower inward facing edges such as 18 to overlap the edge of the canvas 16. The layers are purposely sticky so as to allow this initial assembly and then the layers are placed in a vulcanizing machine which has external and internal mold pieces designed to fit the external shape and the internal shape of the handrail as seen in FIG. 1, and the material is subjected to approximately 300° of temperature to vulcanize the various layers and pieces of rubber together into a single structural mass with the fabric and the steel cables (or whatever else may be required) encapsulated and bonded therein.

In order to provide a finished handrail, of course, two severed ends of a length of the material will have to be joined together.

FIG. 2 illustrates a device in accordance with the present invention assembled on a strip of handrail 2 similar to that illustrated in FIG. 1.

The vulcanizing device is generally elongated and comprises an outer cover formed of a metal sheet 20 which is flexible and made of stainless steel approximately 0.050 inches thick in a curved shape approximately the curvature of the handrail illustrated in FIG. 1, and has longitudinally extending flanges 22 along the lateral edges thereof, with holes 24 spaced therealong so that bolts 26 can be inserted therethrough and fastened by nuts 28 on the opposite side.

Thus the outer sheet may be flexed open to place it over the section of handrail to be spliced or repaired and tightened into the appropriate configuration by means of the bolts 26 and the nuts 28. A spacer 30 is inserted between the flanges 22 to maintain the proper spacing and has depending from it two washers with holes positioned and dimensioned to receive one or more of the bolts 26. This spacer maintains the correct positioning of the flanges 22 when the device is assembled and also provide a handle 32 by which the device may be conventiently carried. In the illustrated embodiment the spacer and handle are metal but might be of any other suitable and convenient material.

Beneath the spacer block is an insulating block 34 of the same dimension running the entire length of the sheet 20 and connected at one end by a further insulating block 36. To the second insulating block is connected a thermostat 38 equipped with an extension cord 40 by which power may be provided to the thermostat and thereby to the rest of the vulcanizing device.

The internal structure and operation of the device is better illustrated in FIGS. 3 and 4 in which the portion of handrail 2 can be seen enclosed between the outer sheet 20 and the inner core of the device 44 which is shaped to conform to the internal dimensions and shape of the handrail 10 in FIG. 1.

The outer sheet is of course held in its appropriate position by flanges 22 and the bolts 26 and nuts 28. The insulating block 34 can be seen lying on top of the upper surface of the core 44 and has running longitudinally along its length channels 46 and 48 respectively which are provided to enable the passage of electrical wires from the thermostat 38 and the block 36 along the device to the bores 50 and 52 respectively on either side of the core which are adapted to receive electric cartridge heaters 54 and 56 respectively.

It can be seen that the insulating block 34 provides thermal insulation by which the heat generated in the core 44 is restricted from heating the bolts 26 and the spacer plate 30 and handle 32, as well as providing electrical insulation for the wires 48.

FIG. 4 illustrates in longitudinal view the device illustrated in FIG. 2 and FIG. 3 in which the holes 24 in the flange 22 are spaced along the length of the sheet 20 and the insulating block 34 has the channels 46 housing the wires 48 which lead to four pairs of cartridge heaters 56 in spaced holes 54 in the core 44.

The core 44 is elongated with a cross-sectional shape which conforms to the shape of the internal surface 16 of the handrail. The wires are connected by leads illustrated at 58 to pole pieces 60 which fit in corresponding holes of the thermostat 38 to effect an electrical connection from a power source to the cartridge heaters. A pole guard 62 is provided to protect the pole 60 against damage.

Thus it can be seen that when two ends of a portion of handrail need to be joined, the appropriate layers of material, either rubber or canvas or the wire cables, can be set up in the appropriate layers by hand in the conventional way and the device of the foregoing description can be used to vulcanize the rubber to form a homogenous continuous length of rubber encapsulating the other elements.

Similarly, if a portion of the rubber handrail is cut or damaged in some way, the damaged portion can be removed, some repair material can be inserted and this device can be used to vulcanize the repair to the existing handrail material.

To effect the necessary repairs or splicing, the present device, which can be built with an overall dimension of approximately 1 to 3 feet in length and weighing in the order of 10 to 30 pounds, can be carried to the field location of the handrail by a single workman and can be powered by plugging it into any conventional electrical outlet by the cord 40.

With the nuts 28 and the bolts 26 removed, the device can be disassembled and the cord 40 inserted into the interior of the handrail in the space 10, once the necessary rubber fabric or wire layers have been put in place in the conventional way.

The outer sheet 20 can then be opened by flexing it and placed over the external surface of the portion of the handrail to be repaired and fastened in place by the bolts 26 and the nuts 28. FIG. 5 illustrates the outer sheet 20 separated from the rest of the apparatus and partially opened as would be required to insert it on a length of continuous handrail.

Once in place the device may be pluged into a conventional outlet and the thermostat sets for the appropriate temperature to vulcanize the material in the handrail (which is conventionally about 300° for approximately 15 to 30 minutes). When the vulcanizing process is completed the device may be simply unpluged and disassembled by removing the nuts and bolts and the handrail may be returned to service immediately while the repair device may be carried away by a single workman.

Thus it can be seen that the present device provides means for splicing or repairing rubber type handrails for escalators or moving sidewalks which is operable in the field to eliminate the necessity for returning the handrail to the factory or shop and which can be easily carried by one person, can be quickly and easily assembled, and operates with a minimum of auxiliary equipment, requiring only a conventional electrical power source.

In addition, the device is so small and light that it can be used on a handrail while it is still mounted on the escalator machinery and since it is capable of manipulation by hand it does not require strong support as did the heavier equipment previously used. It serves to both vulcanize the rubber, as well as mold it in the proper shape.

Furthermore, the present device is relatively simple and inexpensive to make requiring only a minimum of materials and relatively inexpensive amount of tool and die making in the manufacture.

Although the foregoing description refers to specific structures and materials for the purpose of illustrating the invention, it should be realized that numerous modifications and variations might be incorporated without departing from the inventive concept herein.

While the foregoing description refers to fabrication and repair of rubber by vulcanizing, it could also be applied to other elastomers such as the heating of thermoplastics.

Similarly, the embodiment described herein illustrates heating elements which are inserted somewhat vertically or transversely to the axis of the device. Better heating might be achieved by inserting heater cartridges which run parallel to the length of the device along the core element 44, although this configuration would involve more complicated and expensive fabrication.

What I claim as new and desire to protect by Letters Patent of the United States is as follows:

1. A portable apparatus for heating and molding flexible handrails having an internal surface configuration and a curved external surface configuration comprising;
   an elongated core having a cross-sectional shape conforming to the cross-sectional shape of the interior surface configuration of said handrail;
   means for heating said core to a desired temperature;
   an elongated outer cover comprising a flexible sheet detachably attachable to said core and adapted to conform to the curved cross-sectional shape of said external surface of said handrail;
   means for attaching said cover to said core and holding same in a configuration conforming substantially to the external shape of said handrail.

2. An apparatus as claimed in claim 1 in which said heating means comprises electrical cartridge heaters inserted in bore holes at spaced intervals in said core and wiring means adapted to connect said heaters to an electrical power source.

3. An apparatus as claimed in claim 1 in which said outer cover comprises a thin flexible sheet of steel having flanges running longitudinally along the lateral edges thereof.

4. An apparatus as claimed in claim 3 in which said means for attaching said sheet to said core includes a spacer positioned between said flanges, means to fasten said spacer to said core, and bolt means extending through openings in said flanges and said spacers.

5. An apparatus as claimed in claim 4 including an insulating block positioned between said core and said spacer and adapted to thermally and electrically insulate said spacer from said core.

6. An apparatus as claimed in claim 2 in which said wiring means includes a thermostat adapted to control the temperature of said core when heated by said heating means.

7. An apparatus as claimed in claim 5 in which said spacer has a handle mounted thereon by which said apparatus may be carried.

* * * * *